United States Patent
Suzuki

(10) Patent No.: US 11,706,620 B2
(45) Date of Patent: Jul. 18, 2023

(54) COMMUNICATION DEVICE AND NON-TRANSITORY COMPUTER-READABLE MEDIUM STORING COMPUTER-READABLE INSTRUCTIONS FOR COMMUNICATION DEVICE

(71) Applicant: BROTHER KOGYO KABUSHIKI KAISHA, Nagoya (JP)

(72) Inventor: Satoshi Suzuki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 123 days.

(21) Appl. No.: 17/032,532

(22) Filed: Sep. 25, 2020

(65) Prior Publication Data
US 2021/0099872 A1    Apr. 1, 2021

(30) Foreign Application Priority Data

Sep. 27, 2019   (JP) .................. 2019-177989

(51) Int. Cl.
*H04W 12/06*   (2021.01)
*H04W 12/037*   (2021.01)
(Continued)

(52) U.S. Cl.
CPC ....... *H04W 12/068* (2021.01); *H04W 12/037* (2021.01); *H04W 12/0471* (2021.01); *H04W 12/50* (2021.01)

(58) Field of Classification Search
CPC ............. H04W 12/068; H04W 12/037; H04W 12/0471; H04W 12/50; H04W 12/06; H04W 4/50
See application file for complete search history.

(56) References Cited

U.S. PATENT DOCUMENTS 9,015,329 B2 * 4/2015 Chang ...................... G06F 3/14
                                                   709/227
9,397,989 B1 * 7/2016 Ramalingam .......... H04L 63/08
                        (Continued)

FOREIGN PATENT DOCUMENTS

JP      2016-187088 A    10/2016
JP      2016-187090 A    10/2016
                (Continued)

OTHER PUBLICATIONS

Device Provisioning Protocol Technical Specification Version 1.1, Wi-Fi Alliance, 2018.
(Continued)

*Primary Examiner* — Khalid M Almaghayreh
(74) *Attorney, Agent, or Firm* — Scully, Scott, Murphy & Presser, P.C.

(57) ABSTRACT

A communication device may accept an input of user authentication information, cause an output unit to output specific information obtained by using a public key in a case where authentication using the inputted user authentication information is successful. In a case where the authentication using the inputted user authentication information fails, the specific information is not outputted. The communication device may receive an authentication request in which the public key is used from a first external device, send an authentication response to the first external device, receive first connection information from the first external device, and establish a first wireless connection between the communication device and a second external device by using the first connection information.

17 Claims, 8 Drawing Sheets

(51) Int. Cl.
*H04W 12/0471* (2021.01)
*H04W 12/50* (2021.01)

(56) References Cited

U.S. PATENT DOCUMENTS

| | | | |
|---|---|---|---|
| 10,169,587 B1 | 1/2019 | Nix | |
| 10,434,988 B2* | 10/2019 | Gennermann | B60R 25/241 |
| 11,109,228 B2* | 8/2021 | Suzuki | H04L 9/30 |
| 2004/0066756 A1 | 4/2004 | Ahmavaara et al. | |
| 2008/0158597 A1* | 7/2008 | Hashimoto | G06F 21/608 |
| | | | 358/1.15 |
| 2015/0229475 A1* | 8/2015 | Benoit | H04L 63/20 |
| | | | 713/168 |
| 2016/0286021 A1* | 9/2016 | Takeuchi | H04M 1/72412 |
| 2016/0294819 A1* | 10/2016 | Salmela | H04L 63/0853 |
| 2017/0026833 A1* | 1/2017 | Goto | H04W 12/50 |
| 2017/0156174 A1 | 6/2017 | Chaponniere et al. | |
| 2017/0244703 A1* | 8/2017 | Lee | G06V 40/1376 |
| 2018/0069718 A1* | 3/2018 | Terao | H04L 12/28 |
| 2018/0069726 A1* | 3/2018 | Oh | H04W 12/06 |
| 2018/0077318 A1* | 3/2018 | Gusmano | H04N 1/444 |
| 2018/0084098 A1 | 3/2018 | Takeuchi | |
| 2019/0022688 A1* | 1/2019 | Zhang | B05B 9/0861 |
| 2019/0110204 A1 | 4/2019 | Goto | |
| 2019/0215878 A1* | 7/2019 | Goto | H04W 76/18 |
| 2019/0320317 A1 | 10/2019 | Sakai | |
| 2020/0007674 A1 | 1/2020 | Takeuchi | |
| 2021/0297523 A1 | 9/2021 | Takeuchi | |
| 2022/0015161 A1 | 1/2022 | Goto | |

FOREIGN PATENT DOCUMENTS

| | | |
|---|---|---|
| JP | 2017-028454 A | 2/2017 |
| JP | 2017-152927 A | 8/2017 |
| JP | 2018-006983 A | 1/2018 |
| JP | 2018-037978 A | 3/2018 |
| JP | 2018-042058 A | 3/2018 |

OTHER PUBLICATIONS

Extended European Search Report dated Feb. 5, 2021 from related EP 20198313.7.
Official Action dated Feb. 22, 2022 received from the Japanese Patent Office in related application JP 2018-068821 together with English language translation.
Wi-Fi Alliance, Draft Device 1 Provisioning Protocol Technical Specification Version 0.2.11, 2017, pp. 1-113.
Relates to U.S. Appl. No. 17/387,216, filed Jul. 28, 2021.

* cited by examiner

COMMUNICATION DEVICE AND NON-TRANSITORY COMPUTER-READABLE MEDIUM STORING COMPUTER-READABLE INSTRUCTIONS FOR COMMUNICATION DEVICE

CROSS-REFERENCE TO RELATED APPLICATION

This application claims priority to Japanese Patent Application No. 2019-177989 filed on Sep. 27, 2019, the contents of which are hereby incorporated by reference into the present application.

TECHNICAL FIELD

The disclosure herein discloses an art for a communication device being capable of establishing a wireless connection with an external device.

DESCRIPTION OF RELATED ART

A technique for establishing a wireless connection between a camera and an AP using a smartphone is known. The camera displays a QR code (registered trademark), which includes information for executing communication parameter settings, in response to accepting an operation by a user, and starts monitoring receipt of a search signal. The smartphone obtains the information for executing the communication parameter settings by reading the QR code displayed on the camera, and sends a search signal to the camera. In a case of receiving the search signal form the smartphone, the camera sends a response to the search signal to the smartphone. In a case of receiving the response from the camera, the smartphone sets communication parameters by using the obtained information, and sends the set communication parameters to the camera. Further, the smartphone executes a predetermined process with an AP and sends the communication parameters to the AP. Due to this, the camera can establish a wireless connection with the AP using the received communication parameter.

SUMMARY

In the above technique, the wireless connection between the camera and the AP could be established by a third party different from the user of the camera using the smartphone.

The description herein discloses an art configured to suppress a wireless connection from being established between a communication device and a second external device by a third party using a first external device.

A communication device disclosed herein may comprise a processor; an output unit; a wireless interface; and a memory storing computer-readable instructions, wherein the computer-readable instructions, when executed by the processor, cause the communication device to: accept an input of user authentication information for authenticating a user of the communication device; in a case where authentication using the inputted user authentication information is successful, cause the output unit to output specific information obtained by using a public key, the public key being obtained by a first external device in response to the specific information being outputted, wherein in a case where the authentication using the inputted user authentication information fails, the specific information is not outputted; after the specific information has been outputted, receive an authentication request in which the public key is used from the first external device via the wireless interface; in a case where the authentication request is received from the first external device, send an authentication response to the first external device via the wireless interface; after the authentication response has been sent to the first external device, receive first connection information from the first external device via the wireless interface, the first connection information being for establishing a first wireless connection via the wireless interface between the communication device and a second external device; and in a case where the first connection information is received from the first external device, establish the first wireless connection via the wireless interface between the communication device and the second external device by using the first connection information.

Moreover, a communication device disclosed herein may comprise a processor; an output unit; a wireless interface; and a memory storing computer-readable instructions, wherein the computer-readable instructions, when executed by the processor, cause the communication device to: accept an input of user authentication information for authenticating a user of the communication device; in a case where authentication using the inputted user authentication information is successful, shift a state of the communication device from a non-respondent state to a respondent state, wherein in a case where the authentication using the inputted user authentication information fails, the state of the communication device is maintained in the non-respondent state, the non-respondent state being a state where an authentication response which is a response to an authentication request is not sent, the respondent state being a state where the authentication response is sent to a first external device in response to the authentication request being received from the first external device; receive the authentication request from the first external device via the wireless interface; in a case where the authentication request is received from the first external device after the state of the communication device has been shifted to the respondent state, send the authentication response to the first external device via the wireless interface; after the authentication response has been sent to the first external device, receive first connection information from the first external device via the wireless interface, the first connection information being for establishing a first wireless connection via the wireless interface between the communication device and a second external device; and in a case where the first connection information is received from the first external device, establish the first wireless connection via the wireless interface between the communication device and the second external device by using the first connection information.

A method implemented by the above communication device, a computer program, and non-transitory computer-readable medium storing this computer program are also novel and useful. A communication system comprising the above communication device and the other device (e.g., a first external device, a second external device) is also novel and useful.

BRIEF DESCRIPTION OF THE DRAWINGS

EMBODIMENTS (Configuration of Communication System 2; FIG. 1)

As shown in FIG. 1, a communication system 2 comprises two Access Points (APs) 6, 7, a terminal 10, and a printer 100. In the present embodiment, a situation is assumed in which a user uses the terminal 10 to cause a wireless connection according to a Wi-Fi™ scheme (hereinbelow termed "Wi-Fi connection) to be established between the printer 100 and the AP 6. As used herein, "Wi-Fi" refers to Wi-Fi™, which denotes an element of a wireless signal transmission network.

(Configuration of Terminal 10)

Figure 1:
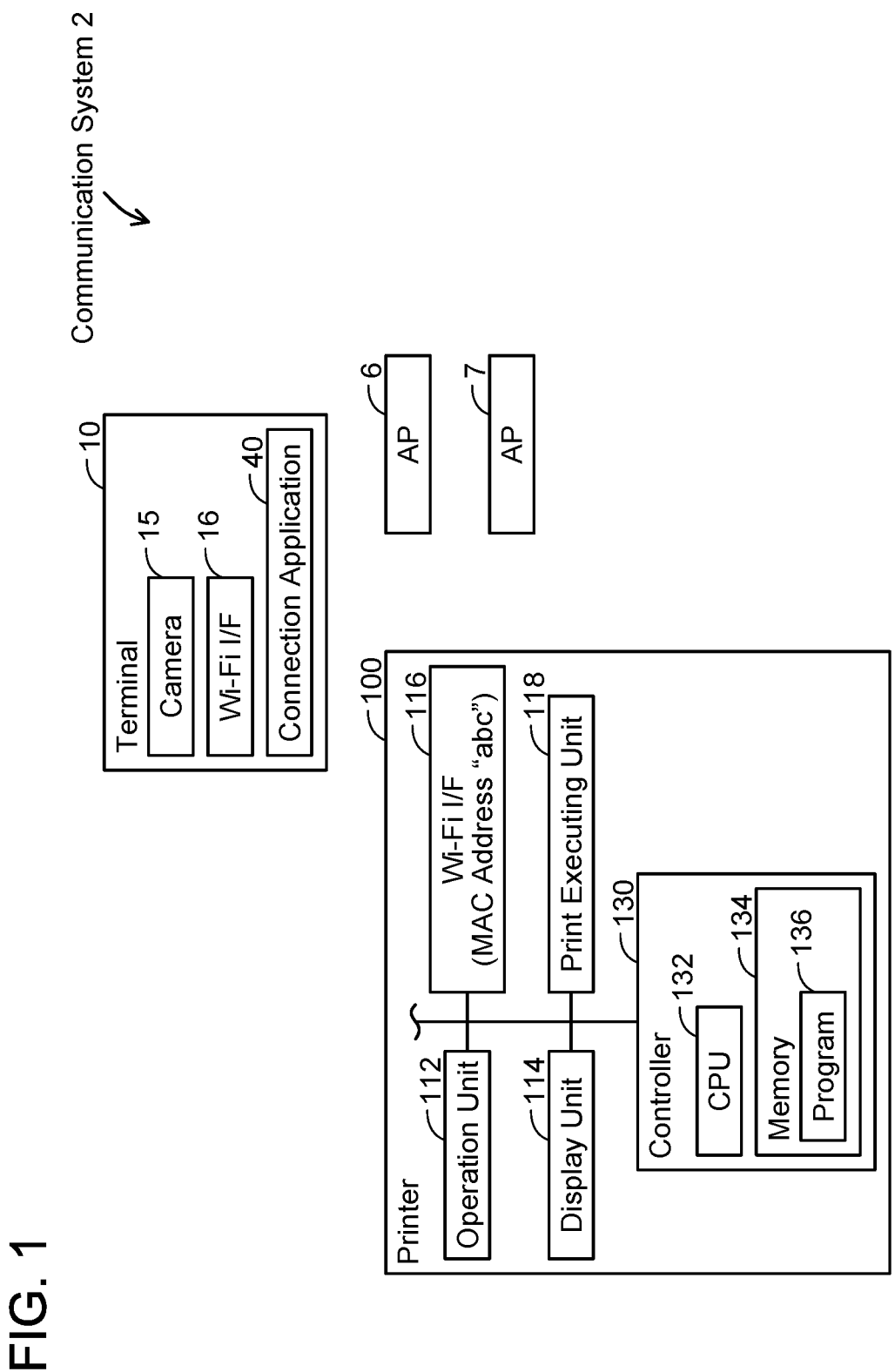
FIG. 1 shows a configuration of a communication system.

The terminal 10 is a portable terminal device such as a cellphone (e.g., a smartphone), a PDA, and a tablet PC. In a variant, the terminal 10 may be a desktop PC, a laptop PC or the like. The terminal 10 comprises a camera 15 and a Wi-Fi interface 16. Hereinbelow, an interface will be termed simply as "I/F". The camera 15 is a device for capturing an image of an object, and in the present embodiment, it is used especially to capture QR codes for the APs 6, 7 and the printer 100. Further, the terminal 10 stores a connection application 40 (hereinbelow simply termed "application 40"). The application 40 is a program for causing a Wi-Fi connection to be established between the printer 100 and an AP (e.g., the AP 6), and is installed in the terminal 10 for example from a server on the Internet provided by a vendor of the printer 100.

The Wi-Fi I/F 16 is a wireless interface configured to execute Wi-Fi communication according to the Wi-Fi scheme. The Wi-Fi scheme is a wireless communication scheme for executing wireless communication according to 802.11 standard of IEEE (the Institute of Electrical and Electronics Engineers, Inc.) and standards complying thereto (such as 802.11a, 11b, 11g, 11n, 11ac, etc.). The Wi-Fi I/F 16 especially supports Device Provisioning Protocol (DPP) scheme that will be established by the Wi-Fi Alliance. The DPP scheme is described in the standard "Device Provisioning Protocol Technical Specification Version 1.1" created by the Wi-Fi Alliance, and is a wireless communication scheme for easily establishing a Wi-Fi connection between a pair of devices (such as between the printer 100 and the AP 6) by using the terminal 10.

(Configuration of Printer 100)

The printer 100 is a peripheral device (e.g., a peripheral device of the terminal 10) capable of executing a print function. The printer 100 comprises an operation unit 112, a display unit 114, a Wi-Fi I/F 116, a print executing unit 118, and a controller 130. The units 112 to 130 are connected to a bus line (reference number omitted).

The operation unit 112 comprises a plurality of keys. The user can input various instructions to the printer 100 by operating the operation unit 112. The display unit 114 is a display for displaying various types of information. The Wi-Fi I/F 116 is the same as the Wi-Fi I/F 16 of the terminal 10. That is, the Wi-Fi I/F 116 supports the DPP scheme. Further, The Wi-Fi I/F 116 has a MAC address "abc". The print executing unit 118 comprises a printing mechanism of ink jet scheme, laser scheme, or the like.

The controller 130 comprises a CPU 132 and a memory 134. The CPU 132 executes various processes in accordance with a program 136 stored in the memory 134. The memory 134 is constituted of a volatile memory, a non-volatile memory, and the like.

Figure 2:
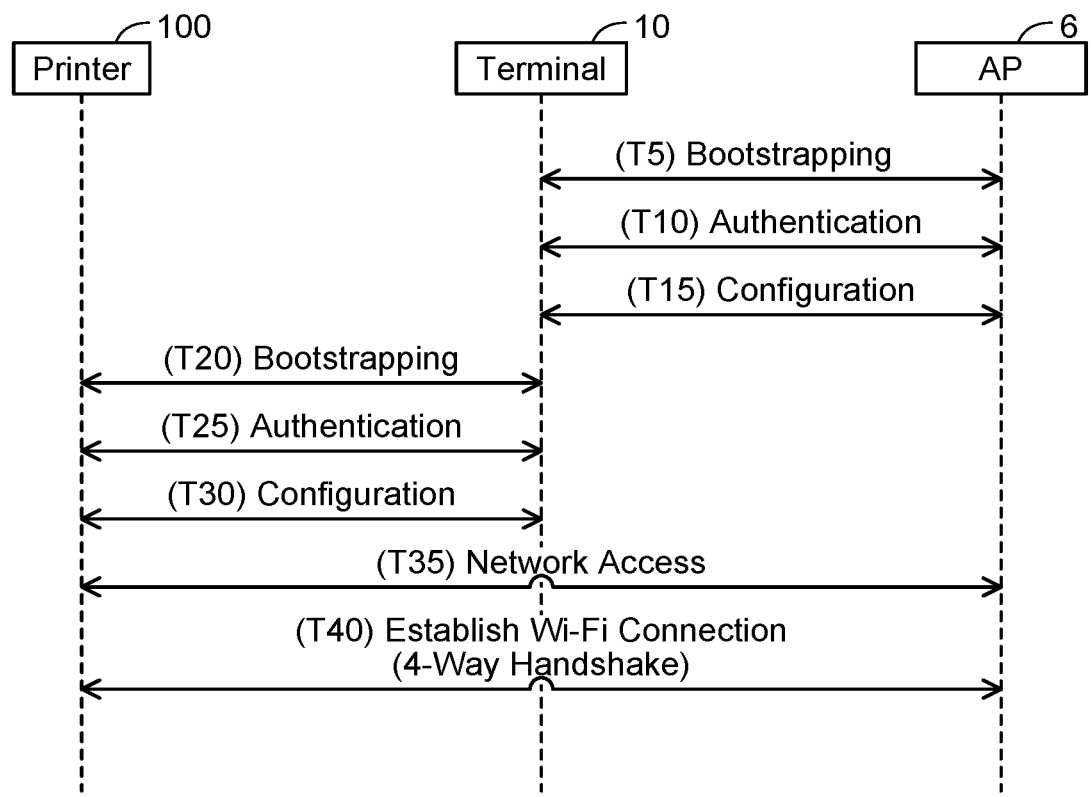
FIG. 2 shows an explanatory diagram for explaining an overview of an embodiment.

(Overview of Present Embodiment; FIG. 2)

Next, an overview of the present embodiment will be described with reference to FIG. 2. It has been aforementioned that the terminal 10 and the printer 100 support the DPP scheme, and the AP 6 also supports the DPP scheme. Further, in the present embodiment, establishment of a Wi-Fi connection between the printer 100 and the AP 6 is realized by each of the devices 6, 10, 100 communicating in accordance with the DPP scheme. Hereinbelow, for facilitating understanding, operations executed by CPUs of the respective devices (such as the CPU 132) will be described with their corresponding devices (such as the printer 100) as subject of action instead of describing them with their corresponding CPU as the subject of action.

In T5, the terminal 10 executes Bootstrapping (hereinbelow simply termed "BS") according to the DPP scheme with the AP 6. The BS is a process of providing, from the AP 6 to the terminal 10, information that is used in Authentication (hereinbelow simply termed "Auth") of T10 to be described later in response to a QR code adhered to the AP 6 being captured by the terminal 10.

In T10, the terminal 10 executes the Auth according to the DPP scheme with the AP 6 by using the information obtained in the BS of T5. This Auth is a process for the terminal 10 and the AP 6 to authenticate their communication counterparts.

In T15, the terminal 10 executes Configuration according to the DPP scheme (hereinbelow simply termed "Config") with the AP 6. This Config is a process of sending information for establishing a Wi-Fi connection between the printer 100 and the AP 6 to the AP 6. Specifically, in this Config, the terminal 10 creates a first Configuration Object (hereinbelow, the Configuration Object will simply be termed "CO") for causing the Wi-Fi connection to be established between the printer 100 and the AP 6 and sends the first CO to the AP 6. As a result, the first CO is stored in the AP 6.

Next, in T20, the terminal 10 executes BS according to the DPP scheme with the printer 100. This BS is a process of providing information to be used in Auth of T25 to be described later from the printer 100 to the terminal 10 in response to the QR code displayed on the printer 100 being captured by the terminal 10.

In T25, the terminal 10 uses the information obtained in the BS of T20 to execute Auth according to the DPP scheme with the printer 100. This Auth is a process for the terminal 10 and the printer 100 to authenticate their communication counterparts.

In T30, the terminal 10 executes Config according to the DPP scheme with the printer 100. This Config is a process of sending information for establishing a Wi-Fi connection between the printer 100 and the AP 6 to the printer 100. In this Config, the terminal 10 creates a second CO for causing the Wi-Fi connection to be established between the printer 100 and the AP 6 and sends the second CO to the printer 100. As a result, the second CO is stored in the printer 100.

In T35, the printer 100 and the AP 6 use the stored first and second COs to execute Network Access according to the DPP scheme (hereinbelow simply termed "NA"). The NA is a process of sharing a connection key for establishing a Wi-Fi connection between the printer 100 and the AP 6.

In T40, the printer 100 and the AP 6 execute 4-way handshake communication. In at least a part of processes of the 4-way handshake communication, the printer 100 and the AP 6 communicate encrypted information that is encrypted using the connection key shared in the NA of T35. Then, the Wi-Fi connection is established between the printer 100 and the AP 6 in a case where decryption of the encrypted information is successful. Due to this, the printer 100 participates in a wireless network formed by the AP 6 as a child station, as a result of which it can communicate via the AP 6 with other devices participating in this wireless network. In a variant, the printer 100 and the AP 6 may execute Simultaneous Authentication of Equals (SAE, so-called "Dragonfly") communication instead of the 4-way handshake communication.

In the DPP scheme, the user does not need to input information (e.g., Service Set Identifier (SSID), password, etc.) of the wireless network in which the AP 6 operates as a parent station to the printer 100 in order to establish a Wi-Fi connection between the printer 100 and the AP 6. Therefore, the user can easily establish a Wi-Fi connection between the printer 100 and the AP 6.

(Explanation of Respective Processes; FIGS. 3 to 9)

Figure 3:
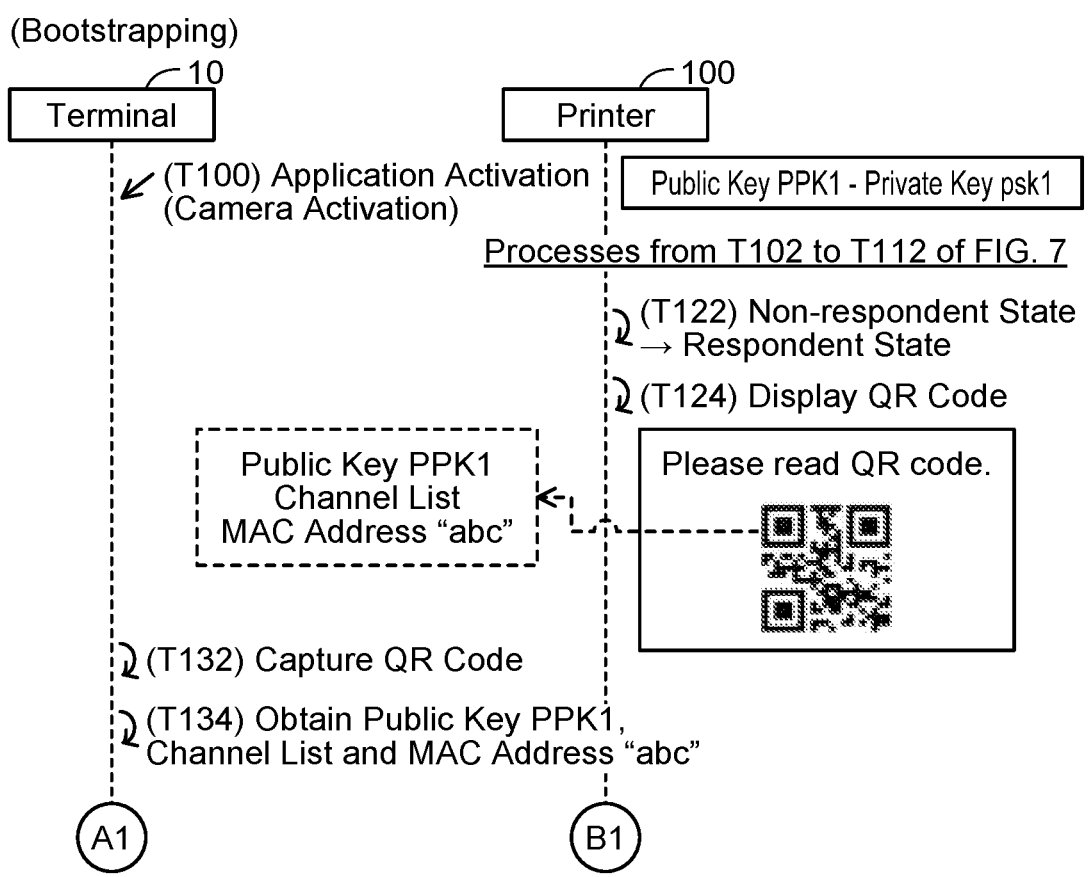
FIG. 3 shows a sequence diagram of an overview of Bootstrapping.
Figure 5:
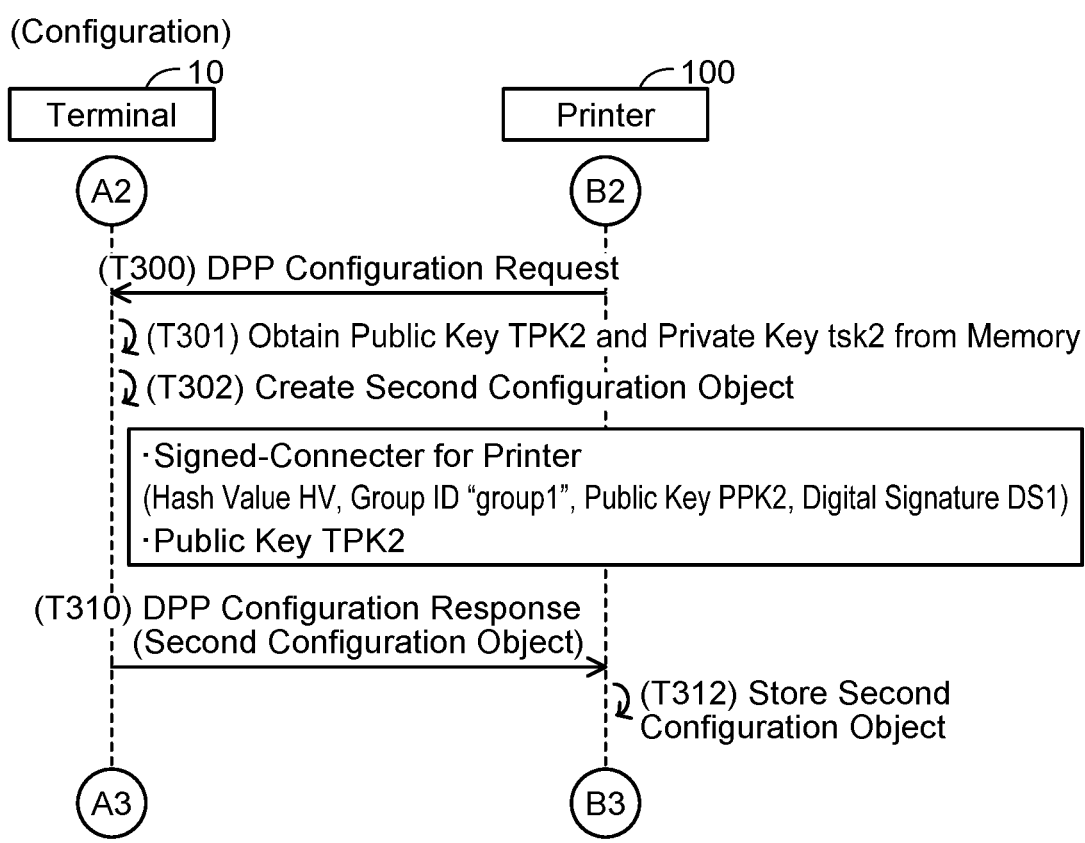
FIG. 5 shows a sequence diagram of Configuration process.
Figure 6:
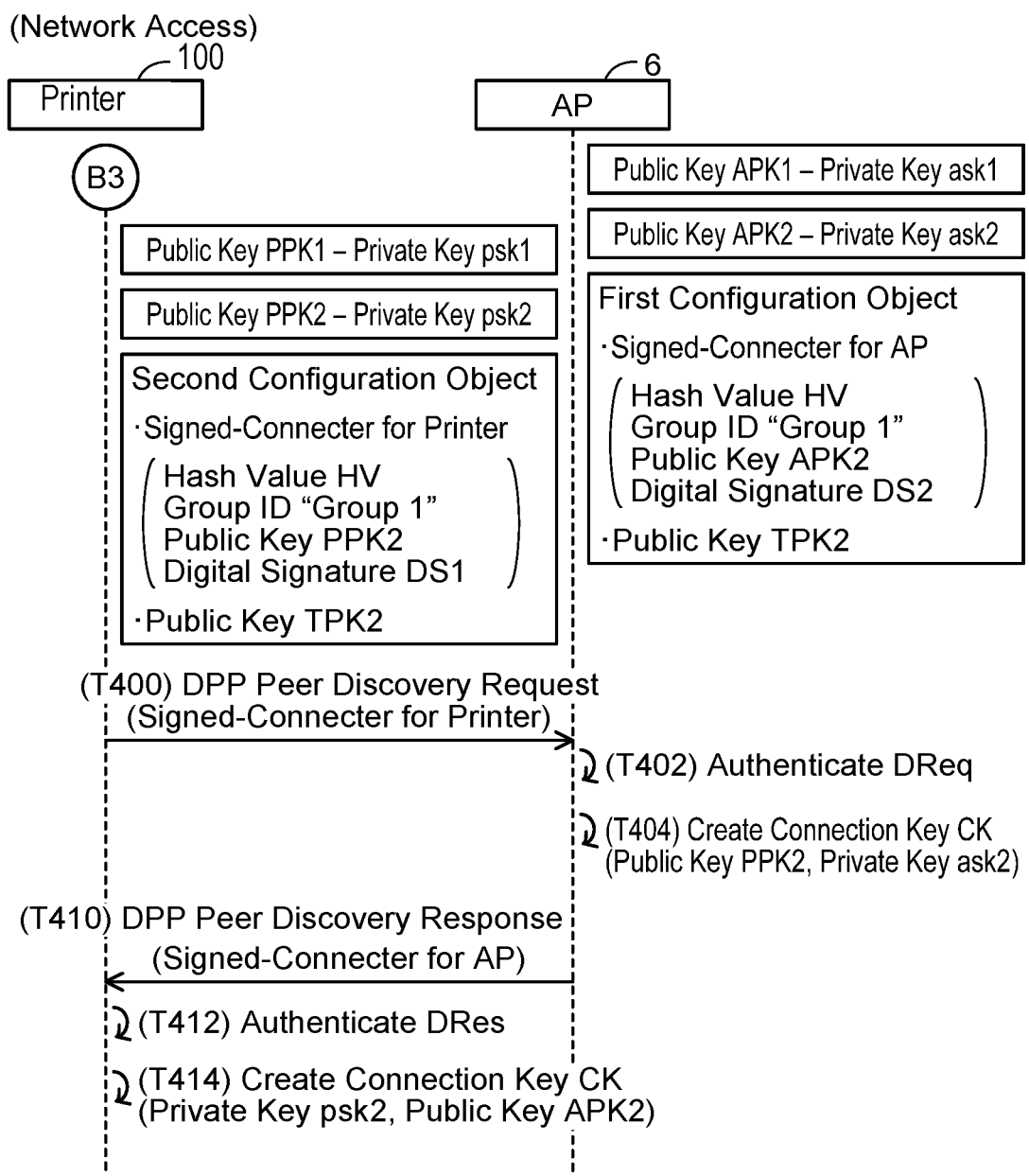
FIG. 6 shows a sequence diagram of Network Access process.
Figure 7:
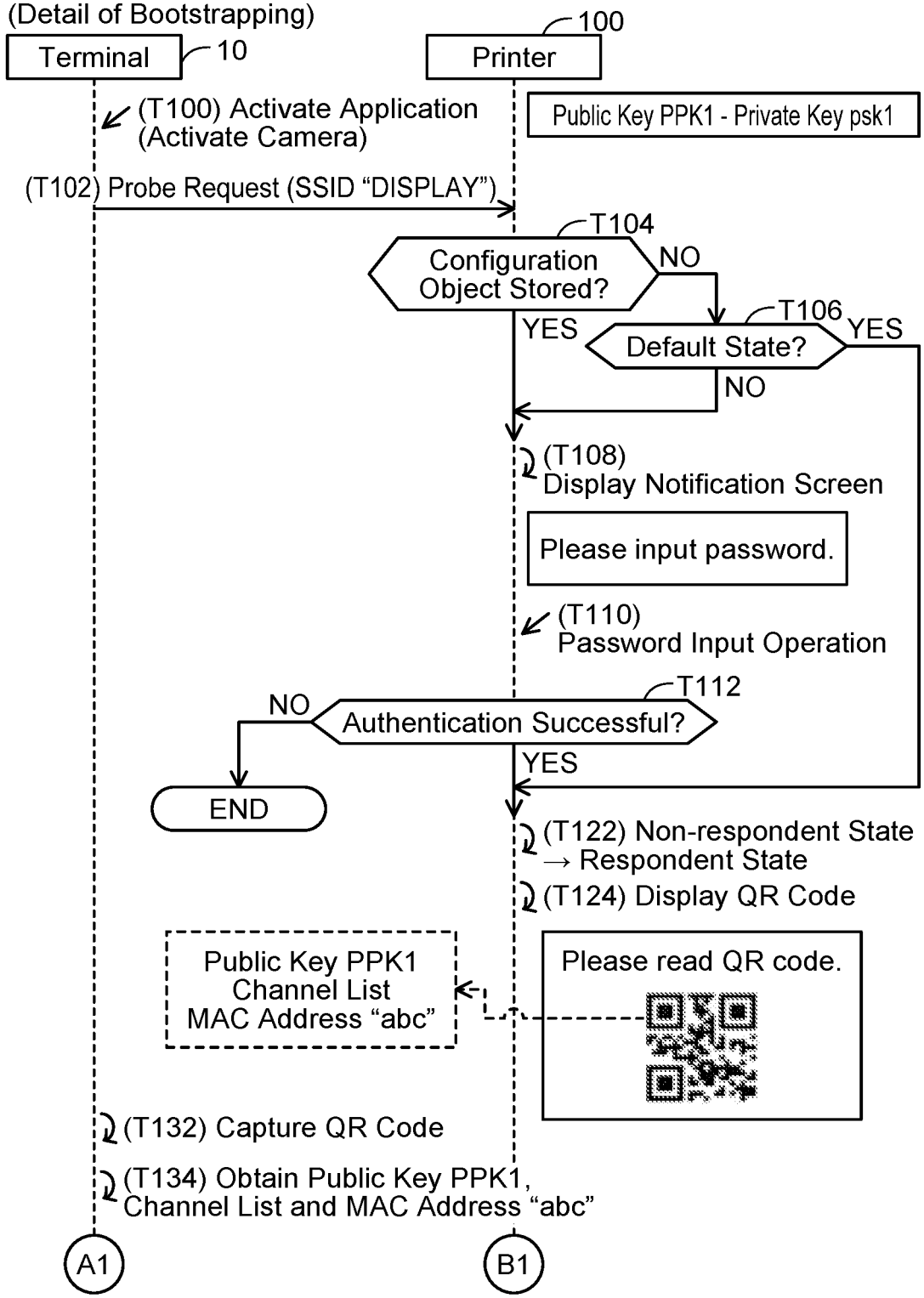
FIG. 7 shows details of the Bootstrapping.
Figure 8:
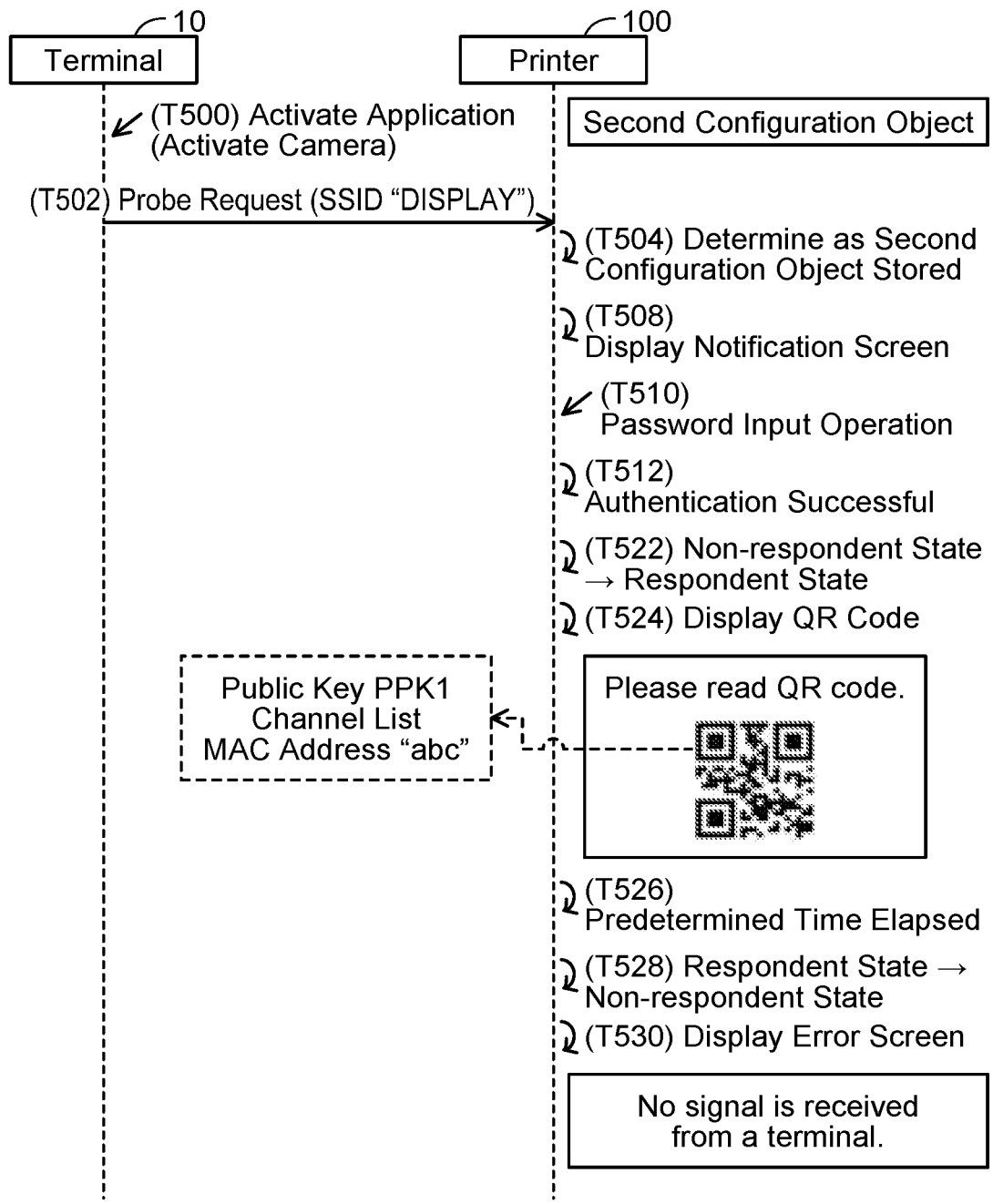
FIG. 8 shows a sequence diagram of a case where a QR code is not captured.

Next, details of respective processes executed in T20 to T35 of FIG. 2 will be described with reference to FIGS. 3 to 9. Since processes of T5 to T15 are similar to processes of T20 to T30 except that the AP 6 is used instead of the printer 100, thus detailed description thereof will be omitted. Further, in regard to the BS, its overview will be shown in FIG. 3 and details thereof will be shown in FIG. 7. Further, FIG. 8 also shows a case of the BS executed between the terminal 10 and the printer 100. FIGS. 3, 7, and 8 are processes executed in one embodiment.

(Overview of Bootstrapping (BS); FIG. 3)

Firstly, an overview of the process of the BS in T20 of FIG. 2 will be described with reference to FIG. 3. In an initial state of FIG. 3, the memory 134 of the printer 100 stores a public key PPK1 and a private key psk1 of the printer 100 in advance. Further, the printer 100 initiates an operation of a non-respondent state to be described later when power of the printer 100 is turned on.

In T100, the terminal 10 activates the application 40 in response to accepting an activation operation of the application 40 from the user, and further activates the camera 15. Respective processes executed hereafter by the terminal 10 is realized by the application 40. Due to the application 40 being activated, processes of T102 to T112 of FIG. 7 to be described later are realized between the terminal 10 and the printer 100.

When the process of T112 is completed, the printer 100 shifts from the non-respondent state to a respondent state in T122. The non-respondent state is a state in which the Wi-Fi I/F 116 does not send a DPP Authentication Response (hereinbelow simply termed "ARes") (see T210 of FIG. 4 to be described later) even if a DPP Authentication Request (hereinbelow simply termed "AReq") is received from the terminal 10 (see T200 to be described later). That is, the non-respondent state is a state in which the ARes being a response to the AReq is not sent. The respondent state is a state in which the Wi-Fi I/F 116 sends the ARes to the terminal 10 in response to receiving the AReq from the terminal 10. That is, the printer 100 enters a state capable of executing the Auth (see T25 of FIG. 2) by shifting from the non-respondent state to the respondent state. Specifically, in the present embodiment, the non-respondent state is a state in which the Wi-Fi I/F 116 does not supply a signal to the CPU 132 even if it receives this signal from an external device. Further, the respondent state is a state in which the Wi-Fi I/F 116 supplies a signal to the CPU 132 in response to receiving this signal from an external device, and sends a response to this signal. Since the respondent state is a state in which the CPU 132 processes the signal received from the external device, its processing load is high as compared to the non-respondent state. In a variant, the non-respondent state may be a state in which power is not supplied to the Wi-Fi I/F 116 and the respondent state may be a state in which the power is supplied to the Wi-Fi I/F 116. Further, in another variant, the non-respondent state may be a state in which the Wi-Fi I/F 116 receives the AReq from the external device but does not supply the CPU 132 with a notification indicating that the AReq has been received, and the respondent state may be a state in which the Wi-Fi I/F 116 supplies the CPU 132 with the notification indicating that the AReq has been received in response to receiving the AReq from the external device.

Next, in T124, the printer 100 causes the display unit 114 to display the QR code. This QR code is a coded image obtained by coding the public key PPK1 stored in the memory 134 in advance, a channel list stored in the memory 134 in advance, and the MAC address "abc" of the Wi-Fi I/F 116. The channel list is a list of a plurality of communication channel values to be used in the Auth (see T25 of FIG. 2). The QR code may be created by the printer 100 when the process of T124 is executed or may be stored in advance in the memory 134 at the time of shipping of the printer 100.

In T132, the terminal 10 captures an image of the QR code displayed on the printer 100 using the camera 15. Then, in T134, the terminal 10 decodes the captured QR code and obtains the public key PPK1, the channel list, and the MAC address "abc".

Figure 4:
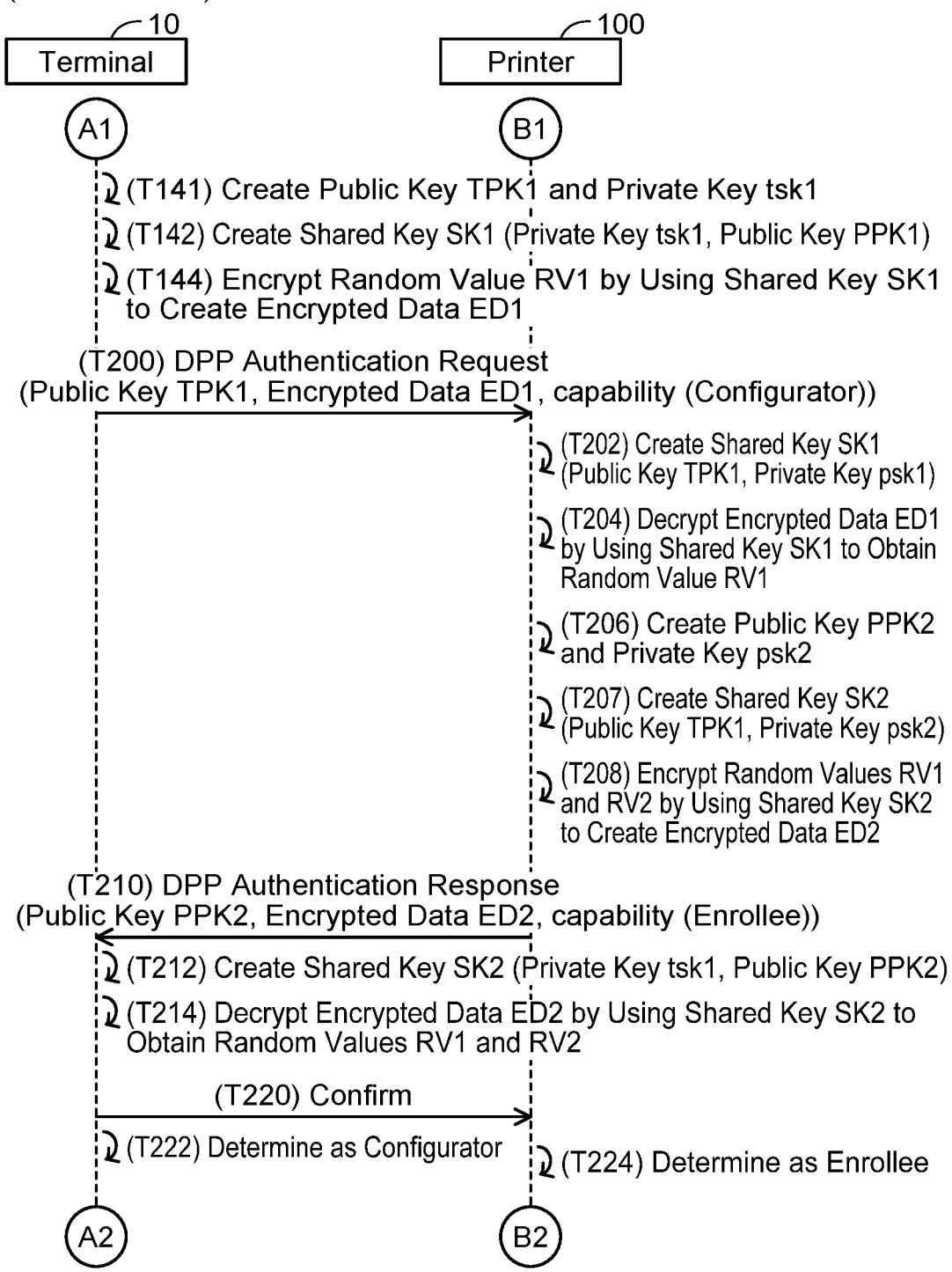
FIG. 4 shows a sequence diagram of Authentication process.

(Authentication (Auth); FIG. 4)

Next, the process of the Auth of T25 of FIG. 2 will be described with reference to FIG. 4. In response to having obtained the public key PPK1, etc. in T134 of FIG. 3, the terminal 10 creates a public key TPK1 and a private key tsk1 of the terminal 10 in T141. Then, in T142, terminal 10 creates a shared key SK1 according to Elliptic curve Diffie-Hellman key exchange (ECDH) by using the created private key tsk1 and the obtained public key PPK1. After this, in T144, the terminal 10 creates encrypted data ED1 by encrypting a random value RV1 using the created shared key SK1.

In T200, the terminal 10 sends an AReq to the printer 100 with the MAC address "abc" obtained in T134 of FIG. 3 as a destination via the Wi-Fi I/F 16. The AReq is a signal requesting the printer 100 to execute authentication. Here, the terminal 10 sequentially uses the plurality of connection channels in the channel list obtained in T134 and repeats sending AReqs to the printer 100. Each AReq includes the public key TPK1 of the terminal 10 created in T141, the encrypted data ED1 created in T144, and capability of the terminal 10.

Capability is information that is pre-designated in a device supporting the DPP scheme and includes a value which is one of: a value indicating that the device is capable of operating only as a Configurator according to the DPP scheme, a value indicating that the device is capable of operating only as an Enrollee according to the DPP scheme, and a value indicating that the device is capable of operating as both the Configurator and the Enrollee. The Configurator refers to a device configured to send a CO that is to be used in NA (T35 of FIG. 2) to the Enrollee in Config (T30 of FIG. 2). On the other hand, the Enrollee refers to a device that receives the CO that is to be used in the NA from the Configurator in the Config. As described above, in this embodiment, the terminal 10 creates the first or second CO and sends them respectively to the AP 6 or the printer 100. As such, the capability of the terminal 10 includes the value indicating that it is capable of operating only as the Configurator.

In T200, the printer 100 receives the AReq from the terminal 10 via the Wi-Fi I/F 116. As described above, this AReq is sent with the MAC address "abc" of the printer 100 as the destination. Therefore, the printer 100 can appropriately receive this AReq from the terminal 10.

Further, when the printer 100 shifts to the respondent state in T124 of FIG. 3, it monitors receipt of an AReq in which a communication channel included in the plurality of communication channels in the list is used. As above, the AReqs of T200 are sent by sequentially using the plurality of communication channels in the channel list. As such, the printer 100 can appropriately receive the AReq from the terminal 10.

Next, the printer 100 executes the following process for authenticating the sender of the AReq (i.e., the terminal 10). Specifically, in T202, the printer 100 creates a shared key SK1 according to the ECDH by using the public key TPK1 of the terminal 10 in the AReq and the private key psk1 of printer 100 stored in the memory 134 in advance. Here, the shared key SK1 created by the terminal 10 in T142 is the same as the shared key SK1 created by the AP 6 in T204. Therefore, in T204, the printer 100 can appropriately decrypt the encrypted data ED1 in the AReq by using the created shared key SK1, as a result of which the printer 100 can obtain the random value RV1. In a case where the decryption of the encrypted data ED1 succeeds, the printer 100 determines that the sender of the AReq is the device that captured the QR code displayed on the printer 100, that is, determines that the authentication has succeeded, and executes processes from T206 onward. On the other hand, in a case where the decryption of the encrypted data ED1 does not succeed, the printer 100 determines that the sender of the AReq is not the device that captured the QR code displayed on the printer 100, that is, determines that the authentication has failed, and does not execute the processes from T206 onward.

In T206, the printer 100 creates a new public key PPK2 and a new private key psk2 of the printer 100. In a variant, the public key PPK2 and the private key psk2 is stored in the memory 134 in advance. Next, in T207, the printer 100 creates a shared key SK2 according to the ECDH by using the public key TPK1 of the terminal 10 in the AReq of T200 and the created private key psk2 of the printer 100. Then, in T208, the printer 100 encrypts the obtained random value RV1 and a new random value RV2 by using the created shared key SK2 to create encrypted data ED2.

In T210, the printer 100 sends an ARes to the terminal 10 via the Wi-Fi I/F 116. This ARes includes the public key PPK2 of the printer 100 created in T206, the encrypted data ED2 created in T208, and the capability of the printer 100. This capability includes a value indicating that the printer 100 is capable of operating only as an Enrollee.

In T210, the terminal 10 executes the following process for authenticating the sender of this ARes (i.e., the printer 100) in response to receiving the ARes from the printer 100 via the Wi-Fi I/F 16. Specifically, in T212, the terminal 10 creates a shared key SK2 according to the ECDH by using the private key tsk1 of the terminal 10 created in T141 and the public key PPK2 of the printer 100 in the ARes. Here, the shared key SK2 created by the printer 100 in T207 is the same as the shared key SK2 created by the terminal 10 in T212. Therefore, in T214, the terminal 10 can appropriately decrypt the encrypted data ED2 in the ARes by using the created shared key SK2, as a result of which the terminal 10 can obtain the random values RV1 and RV2. In a case where the decryption of the encrypted data ED2 succeeds, the terminal 10 determines that the sender of the ARes is the device displaying the captured QR code, that is, determines that the authentication has succeeded, and executes processes from T220 onward. On the other hand, in a case where the decryption of the encrypted data ED2 does not succeed, the terminal 10 determines that the sender of the ARes is not the device displaying the captured QR code, that is, determines that the authentication has failed, and does not execute the processes from T220 onward.

In T220, the terminal 10 sends a Confirm to the printer 100 via the Wi-Fi I/F 16. The Confirm includes information indicating that the terminal 10 operates as the Configurator and the printer 100 operates as the Enrollee. As a result, the terminal 10 determines to operate as the Configurator in T222, and the printer 100 determines to operate as the Enrollee in T224. When the process of T224 is completed, the process of FIG. 4 is terminated.

(Configuration (Config); FIG. 5)

Next, the process of the Config in T30 of FIG. 2 will be described with reference to FIG. 5. In T300, the printer 100 sends a DPP Configuration Request (hereinbelow simply termed "CReq") to the terminal 10 via the Wi-Fi I/F 116. This CReq is a signal requesting a CO (i.e., information for establishing the Wi-Fi connection between the printer 100 and the AP 6) to be sent.

In T300, the terminal 10 receives the CReq from the printer 100 via the Wi-Fi I/F 16. In this case, the terminal 10 obtains a group ID "Group1", a public key TPK2, and a private key tsk2 from a memory (not shown) of the terminal 10 in T301. As aforementioned, the terminal 10 has already executed the Config of T15 of FIG. 2 with the AP 6, and in doing so, it created the group ID "Group1", the public key TPK2, and the private key tsk2 and stored them in the memory. The group ID "Group1" is information identifying a wireless network that is formed by establishment of the Wi-Fi connection between the printer 100 and the AP 6. In a variant, a letter string designated by the user may be used as the group ID. That is, in T301, the terminal 10 obtains the respective information stored in T15 of FIG. 2. Then, in T302, the terminal 10 creates a second CO (see T30 of FIG. 2). Specifically, the terminal 10 executes the following processes.

The terminal 10 creates a hash value HV by hashing the public key TPK2 of the terminal 10. Further, the terminal 10 creates a specific value by hashing a combination of the hash value HV, the group ID "Group1", and the public key PPK2 of the printer 100 in the ARes of T210 of FIG. 4. Then, the terminal 10 creates a digital signature DS1 by encrypting the created specific value according to Elliptic Curve Digital Signature Algorithm (ECDSA) using the private key tsk2 of the terminal 10. As a result of this, the terminal 10 can create a Signed-Connector for printer (hereinbelow, a Signed-Connector will simply be termed "SCont") including the hash value HV, the group ID "Group1", the public key PPK2 of the printer 100, and the digital signature DS1. Then, the terminal 10 creates the second CO including the SCont for printer and the public key TPK2 of the terminal 10.

In T310, the terminal 10 sends a DPP Configuration Response (hereinbelow simply termed "CRes") including the second CO to the printer 100 via the Wi-Fi I/F 16.

The printer 100 receives the CRes from the terminal 10 in T310 via the Wi-Fi I/F 116. In this case, in T312, the printer 100 stores the second CO in this CRes in its memory 134. When the process of T312 is completed, the process of FIG. 5 is terminated.

(Network Access (NA); FIG. 6)

Next, the process of the NA executed between the printer 100 and the AP 6 in T35 of FIG. 2 will be described with reference to FIG. 6. As aforementioned, similar to T20 to T30 of FIG. 2, the processes of T5 to T15 of FIG. 2 have already been executed between the terminal 10 and the AP 6. However, the AP 6 does not execute processes of T102 to T124 of FIG. 7. The AP 6 stores a public key APK1 and a private key ask1 of the AP 6 in advance. Further, a QR code obtained by coding the public key APK1 of the AP 6, a channel list of the AP 6, and a MAC address of the AP 6 is adhered to a body of the AP 6. Processes similar to the processes from T134 are executed between the terminal 10 and the AP 6 by the terminal 10 capturing an image of this QR code. As a result of this, the AP 6 stores a public key APK2 and a private key ask2 of the AP 6 (see T206 of FIG. 4), and further stores the first CO received from the terminal 10 (see T312 of FIG. 5). The first CO includes a SCont for AP and the public key TPK2 of the terminal 10. This public key TPK2 is same as the public key TPK2 included in the second CO. Further, the SCont for AP includes a hash value HV, a group ID "Group1", the public key APK2 of the AP 6, and a digital signature DS2. The hash value HV and the group ID "Group1" as above are same as the hash value HV and the group ID "Group1" included in the second CO. The digital signature DS2 is information in which a specific value obtained by hashing a combination of the hash value HV, the group ID "Group1", and the public key APK2 is encrypted by the private key tsk2 of the terminal 10, and is a value different from the digital signature DS1 included in the second CO.

In T400, the printer 100 sends a DPP Peer Discovery Request (hereinbelow simply termed "DReq") including the SCont for printer to the AP 6 via the Wi-Fi I/F 116. This DReq is a signal requesting the AP 6 to execute authentication and send the SCont for AP.

In response to receiving the DReq from the printer 100 in T400, the AP 6 executes processes for authenticating a sender of the DReq (i.e., the printer 100) and the respective information in the DReq (i.e., the hash value HV, "Group1", and public key PPK2). Specifically, in T402, the AP 6 firstly executes a first AP determination process regarding whether the hash value HV and the group ID "Group1" in the received SCont for printer respectively match the hash value HV and the group ID "Group1" in the SCont for AP included in the stored first CO. In case of FIG. 6, the AP 6 determines "matched" in the first AP determination process, thus a determination is made that the authentication of the sender of the DReq (i.e., the printer 100) was successful. The hash value HV in the received SCont for printer matching the hash value HV in the SCont for AP included in the stored first CO means that the SCont for printer and the SCont for AP were created by a same device (i.e., the terminal 10). As such, the AP 6 also determines that the authentication of a creator of the SCont for printer (i.e., the terminal 10) was successful. Further, the AP 6 decrypts the digital signature DS1 in the received SCont for printer using the public key TPK2 of the terminal 10 included in the stored first CO. In the case of FIG. 6, the decryption of the digital signature DS1 is completed successfully, so the AP 6 executes a second AP determination process regarding whether the specific value obtained by decrypting the digital signature DS1 and a value obtained by hashing the respective information in the SCont for printer (i.e., the hash value HV, "Group1", and public key PPK2) match. In the case of FIG. 6, the AP 6 determines "matched" in the second AP determination process, thus a determination is made that the authentication of the respective information in the DReq was successful, and processes from T404 are executed. The determination of "matched" in the second AP determination process means that the respective information in the received SCont for printer (i.e., the has value HV, "Group1", and public key PPK2) have not been tampered by a third party after the second CO was stored in the printer 100. On the other hand, in any of cases where: "not matched" is determined in the first AP determination process; the decryption of the digital signature DS1 fails; and "not matched" is determined in the second AP determination process, the AP 6 determines that the authentication failed, and does not execute the processes from T404.

Next, in T404, the AP 6 creates a connection key (i.e., a shared key) CK according to the ECDH using the obtained public key PPK2 of the printer 100 and the private key ask2 of the AP 6.

In T410, the AP 6 sends a DPP Peer Discovery Response (hereinbelow simply termed "DRes") including the SCont for AP to the printer 100.

In response to receiving the DRes from the AP 6 via the Wi-Fi I/F 116 in T410, the printer 100 executes the processes for authenticating the sender of the DRes (i.e., the AP 6) and the respective information (i.e., the hash value HV, "Group1", and public key APK2) in the DRes. Specifically, the printer 100 firstly executes in T412 a first PR determination process regarding whether the hash value HV and the group ID "Group1" in the received SCont for AP respectively match the hash value HV and the group ID "Group1" in the SCont for printer included in the stored second CO. In the case of FIG. 6, since the printer 100 determines "matched" in the first PR determination process, it determines that the authentication of the sender of the DRes (i.e., the AP 6) was successful. The hash value HV in the received SCont for AP matching the hash value HV in the SCont for printer included in the stored second CO means that the SCont for printer and the SCont for AP were created by a same device (i.e., the terminal 10). As such, the printer 100 also determines that the authentication of a creator of the SCont for AP (i.e., the terminal 10) was successful. Further, the printer 100 decrypts the digital signature DS2 in the received SCont for AP using the public key TPK2 of the terminal 10 included in the stored second CO. In the case of FIG. 6, the decryption of the digital signature DS2 is successful, so the printer 100 executes a second PR determination process regarding whether a specific value obtained by decrypting the digital signature DS2 and a value obtained by hashing the respective information in the SCont for AP (i.e., the hash value HV, "Group1", and public key APK2) match. In the case of FIG. 6, the printer 100 determines "matched" in the second PR determination process, thus a determination is made that the authentication of the respective information in the DRes was successful, and processes from T414 are executed. The determination of "matched" in the second PR determination process means that the respective information (i.e., hash value HV, "Group1", and public key APK2) in the SCont for AP have not been tampered by a third party after the first CO was stored in the AP 6. On the other hand, in any of cases where: "not matched" is determined in the first PR determination process; the decryption of the digital signature DS2 fails; and "not matched" is determined in the second PR determination process, the printer 100 determines that the authentication failed, and does not execute the processes from T414.

In T414, the printer 100 creates a connection key CK according to the ECDH using the stored private key psk2 of the printer 100 and the public key APK2 of the AP 6 in the received SCont for AP. Here, the connection key CK created by the AP 6 in T404 and the connection key CK created by the printer 100 in T414 are same. Due to this, the connection key CK for establishing the Wi-Fi connection is shared between the printer 100 and the AP 6. When T414 is completed, the process of FIG. 6 is terminated.

As aforementioned, after the connection key CK has been shared between printer 100 and the AP 6, the printer 100 and the AP 6 execute the 4-way handshake communication in T40 of FIG. 2 using the connection key CK. As a result of this, the Wi-Fi connection is established between the printer 100 and the AP 6. As aforementioned, the printer 100 receives the AReq in T200 of FIG. 4 from the terminal 10 using one communication channel among the plurality of communication channels included in the channel list of the printer 100. That is, the printer 100 uses the communication channel capable of being used by both the printer 100 and the terminal 10 to receive the AReq in T200 from the terminal 10. On the other hand, in T40 of FIG. 2, the printer 100 establishes the Wi-Fi connection with the AP 6 using the communication channel capable of being used by both the printer 100 and the AP 6. Here, the communication channel capable of being used by the terminal 10 and the communication channel capable of being used by the AP 6 may be different from each other. In the present embodiment, the communication channel for the printer 100 to receive the AReq from the terminal 10 in T200 of FIG. 4 and the communication channel for the printer 100 to establish the Wi-Fi connection with the AP 6 in T40 of FIG. 2 are different. However, in a variant, the former communication channel and the latter communication channel may be same.

(Details of Bootstrapping (BS); FIG. 7)

Next, details of the BS in FIG. 3 will be described with reference to FIG. 7. Especially, processes of T102 to T112 will be described.

When the application 40 is activated in T100, the terminal 10 broadcasts a PReq via the Wi-Fi I/F 16 in T102. This PReq includes a SSID "DISPLAY" that is predetermined in the application 40. A letter string of the SSID in the PReq is not limited to "DISPLAY", and may be any letter string which the printer 100 is capable of interpreting.

When the PReq is received from the terminal 10 via the Wi-Fi I/F 116 in T102, the printer 100 obtains the SSID "DISPLAY" from the Wi-Fi I/F 116. In this case, since the SSID included in the received PReq includes the predetermined letter string "DISPLAY", the printer 100 executes processes from T104. If the SSID does not include the predetermined letter string "DISPLAY", the printer 100 skips the processes from T104 and terminates the process of FIG. 7.

In T104, the printer 100 determines whether the second CO is stored in the memory 134. As aforementioned, the printer 100 stores the second CO in the memory 134 (see T312 of FIG. 5) in the case where the Config process is executed with the terminal 10 and executes the NA with an AP using this second CO (see FIG. 6). That is, the second CO being stored in the memory 134 means that the NA has already been executed between the printer 100 and an AP (such as the AP 7 different from the AP 6) and a Wi-Fi connection is already established between the printer 100 and this AP. In a case of determining that the second CO is stored in the memory 134, that is, in a case of determining that the Wi-Fi connection is already established between the printer 100 and an AP (YES to T104), the printer 100 proceeds to T108. On the other hand, in a case of determining that the second CO is not stored in the memory 134, that is, in a case of determining that no Wi-Fi connection is established between the printer 100 and any of the APs (NO to T104), the printer 100 proceeds to T106.

In T106, the printer 100 determines whether a state of the printer 100 is a default state. The default state is a state in which a default password is stored in the memory 134 as a password for authenticating the user. The default password is stored in advance in the memory 134 at the time of shipping of the printer 100, and is described for example in a manual for the printer 100. The default password is used to log into the printer 100. Specifically, the printer 100 operates as a server on a wired Local Area Network (LAN). In a case of receiving a login request from a terminal (such as 10) via the wired LAN, the printer 100 causes a password input screen to be displayed on the terminal. Login of the terminal to the printer 100 is completed in a case where a password inputted to the password input screen matches the default password. In a login state, the terminal can access the printer 100 and display a changing screen for changing setting values in the printer 100 (e.g., the default password, values related to network settings, etc.). For example, in a case where a new password is inputted on the changing screen, the terminal sends the new password to the printer 100. Due to this, the printer 100 stores the new password in the memory 134 as a substitute to the default password. In a state where the new password is stored in the memory 134, only the user who knows the new password can change the setting values of the printer 100.

In a case of determining that the state of the printer 100 is the default state (YES to T106), the printer 100 skips processes of T108 to T112 to be described later and executes a process of T122. On the other hand, in a case of determining that the state of the printer 100 is not the default state, that is, it is in the state having the new password stored in the memory 134 (NO to T106), the printer 100 proceeds to T108.

In T108, the printer 100 causes the display unit 114 to display a notification screen notifying the user that an input of a password can be accepted.

In T110, the printer 100 accepts the input of a password by multiple keys in the operation unit 112 being operated by the user.

In T112, the printer 100 executes authentication using the password inputted in T110. The printer 100 determines that the authentication was successful in a case where the inputted password matches the password in the memory 134 (YES to T112) and proceeds to T122. Due to this, as aforementioned, the state of the printer 100 shifts to the respondent state (T122), the QR code is displayed (T124), and the BS with the terminal 10 is executed. On the other hand, in a case where the inputted password does not match the password in the memory 134, the printer 100 determines that the authentication failed (NO to T112), skips the processes from T122, and terminates the process of FIG. 7. That is, the BS with the terminal 10 is not executed.

According to such a configuration, the printer 100 display the QR code obtained by coding the public key PPK1 (T124) in the case where the authentication using the inputted password is successful (YES to T112). On the other hand, in the case where the authentication using the inputted password fails (NO to T112), the printer 100 does not display the QR code. As a result of this, the processes from the BS are not executed. Due to this, the Wi-Fi connection being established between the printer 100 and the AP 6 due to a third party different from the user of the printer 100 (i.e., a user who does not know the password) using the terminal 10 can be suppressed.

Further, according to such a configuration, the printer 100 shifts the state of the printer 100 to the respondent state (T122) in the case where the authentication using the inputted password is successful (YES to T112). On the other hand, in the case where the authentication using the inputted password fails (NO to T112), the printer 100 maintains the state of the printer 100 in the non-respondent state. That is, in the case where the password authentication fails, the ARes in response to the AReq from the terminal 10 is not sent, and the process of the Auth cannot be completed. As a result of this, the Wi-Fi connection is not established between the printer 100 and the AP 6. Due to this, the Wi-Fi connection being established between the printer 100 and the AP 6 due to the third party different from the user of the printer 100 (i.e., the user who does not know the password) using the terminal 10 can be suppressed.

Further, the printer 100 shifts to the respondent state and displays the QR code (T122, T124) in the case where the second CO is stored in the memory 134 and the authentication using the inputted password is successful (YES to T104 and YES to T112). That is, in the situation in which the Wi-Fi connection is already established between the printer 100 and an AP (especially another AP), the user must input the password to shift to the respondent state and display the QR code. Due to this, for example, in the situation in which the Wi-Fi connection is already established between the printer 100 and the AP 7, the Wi-Fi connection with another AP 6 being established without permission can be suppressed.

Further, the printer 100 shifts to the respondent state and displays the QR code (T122, T124) in the case where the state of the printer 100 is not the default state and the authentication using the inputted password is successful (YES to T106 and YES to T112). The new password being stored in the memory 134 means that usage of the printer 100 is limited to the user who had inputted the new password. In such a situation in which the usage of the printer 100 is limited, the Wi-Fi connection with an AP (such as the AP 6) being established without permission can be suppressed.

Further, the printer 100 shifts to the respondent state and displays the QR code (T122, T124) without accepting the input of the password in the case where the second CO is not stored in the memory 134 and the state of the printer 100 is the default state (NO to T104 and NO to T106). This case means that the printer 100 has no Wi-Fi connection established with any of the APs, and further the default password is stored in the memory 134. That is, it is highly likely that the printer 100 is still in a state as the time of shipping. In this case, convenience for the user can be improved by dismissing password input.

Further, the printer 100 displays the notification screen (T108) in the case of receiving the PReq including the SSID "DISPLAY" from the terminal 10 (T102 of FIG. 7). According to such a configuration, the user can acknowledge, without having have to operate the printer 100 but simply by activating the application 40 in the terminal 10, that the password should be inputted.

(Case in which QR Code is not Captured: FIG. 8)

Next, processes in another case of the BS will be described with reference to FIG. 8. In the present case, a situation is assumed in which the QR code displayed on the printer 100 is not captured by the terminal 10. Further, the present case is a continuation from FIG. 6. That is, the second CO is stored in the memory 134 of the printer 100.

T500 and T502 are similar to T100 and T102 of FIG. 7. In T504, the printer 100 determines that the second CO is stored in the memory 134 (YES to T104 of FIG. 7). T508 and T510 are similar to T108 and T110 of FIG. 7. In T512, the printer 100 determines that the authentication of the password inputted in T510 was successful (YES to T112). T522 and T524 are similar to T122 and T124 of FIG. 7. In the present case, the QR code displayed on the printer 100 is not captured by the terminal 10, by which the AReq (see T200 of FIG. 4) is not sent from the terminal 10 to the printer 100. In this case, the printer 100 determines in T526 that the AReq is not received within a predetermined time period since it had shifted to the respondent state in T522, and shifts from the respondent state to the non-respondent state in T528. Due to this, the respondent state can be suppressed from being maintained in the printer 100 over a long period of time. That is, the state in which the Wi-Fi I/F 116 supplies a signal received from an external device to the CPU 132, that is, the state in which the CPU 132 processes the signal received from the external device can be suppressed from being maintained. Due to this, processing load of the printer 100 can be reduced. Then, in T530, the printer 100 causes the display unit 114 to display an error screen indicating that the AReq from the terminal 10 was not received. When the process of T530 is completed, the process of FIG. 8 is terminated.

(Corresponding Relationship)

The printer 100, the terminal 10, and the AP 6 are respectively an example of "communication device", "first external device", and "second external device". The display unit 114 and the Wi-Fi I/F 116 are respectively an example of "output unit" and "wireless interface". The password is an example of "user authentication information". The public key PPK1 and the QR code of the printer 100 are respectively an example of "public key" and "specific information". The AReq, the ARes, and the second CO in T310 of FIG. 5 are respectively an example of "authentication request", "authentication response", and "first connection information". The Wi-Fi connection established in T40 of FIG. 2 is an example of "first wireless connection".

The AP 7, the second CO stored in the memory 134 in the Config with the AP 7, and the Wi-Fi connection with the AP 7 are respectively an example of "third external device", "second connection information", and "second wireless connection". The default state and the state in which the new password is stored in the memory 134 are respectively an example of "first state" and "second state". The channel list, the communication channel used in T200 of FIG. 4, and the communication channel used in T40 of FIG. 2 are respectively an example of "communication channel information", "first communication channel", and "second communication channel". The predetermined time having elapsed in T526 of FIG. 8 is an example of "specific condition".

T110 and T124 of FIGS. 7, T200 and T210 of FIG. 4, T310 of FIG. 5, and T40 of FIG. 2 are respectively an example of "accept an input of user authentication information", "cause the output unit to output specific information", "receive an authentication request", "send an authentication response", "receive first connection information", and "establish the first wireless connection".

T110 and T122 of FIGS. 7, T200 and T210 of FIG. 4, T310 of FIG. 5, and T40 of FIG. 2 are respectively an example of "accept an input of user authentication information", "shift a state of the communication device from a non-respondent state to a respondent state", "receive the authentication request", "send the authentication response", "receive first connection information", and "establish the first wireless connection".

(Variant 1) For example, the QR code displayed on the printer 100 in T124 of FIG. 7 may not be configured by coding the channel list and the MAC address "abc". That is, the QR code may simply be a coded image obtained by coding at least the public key PPK1. In this case, in response to shifting from the non-respondent state to the respondent state in T122, the printer 100 monitors receipt of the AReq in which one wireless channel is used among all wireless channels which the printer 100 is capable of using. Further, the terminal 10 broadcasts the AReq in T200 of FIG. 4 by sequentially using all wireless channels which the terminal 10 is capable of using. That is, the "specific information" simply needs to be information that is obtained by using at least the public key.

(Variant 2) A process for creating a shared key (for example, SK1) (e.g., T142, T202 of FIG. 4) is not limited to the process according to the ECDH as described in the above embodiment, and may be another process according to the ECDH. Further, a process for creating a shared key is not limited to a process according to the ECDH, and a process according to another scheme (for example, DH (Diffie-Hellman key exchange), etc.) may be executed. Further, in the above embodiment, the digital signatures DS1 and DS2 are created according to the ECDSA, however, they may be created according to another scheme (for example, DSA (Digital Signature Algorithm), RSA (Rivest-Shamir-Adleman cryptosystem) etc.).

(Variant 3) For example, in T102 of FIG. 7, the terminal 10 may send a Service Discovery Request according to a Wi-Fi Direct (registered trademark, WFD) scheme instead of the PReq. This Request includes information for inquiring whether the printer 100 is capable of displaying the QR code. In this variant, the Service Discovery Request is an example of "specific signal". In another variant, the terminal 10 may send a signal using another scheme different from the Wi-Fi scheme (such as a Near Field Communication (NFC) scheme and a Bluetooth® (registered trademark) scheme) to the printer 100 instead of the PReq. In this variant, the signal using the other scheme is an example of "specific signal". As used herein, "Bluetooth" refers to Bluetooth®, which denotes an element of a wireless signal transmission network.

(Variant 4) In the above embodiment, the printer 100 displays the notification screen in the case of receiving the PReq from the terminal 10 (T108 of FIG. 7). Instead of this, the printer 100 may display the notification screen in a case where a predetermined operation is performed on the operation unit 112. In this variant, "receive a specific signal" may be omitted. Further, in another variant, the printer 100 may output audio notifying the user that the password input is acceptable instead of the notification screen, and/or may turn on a light indicating a notification as such. In this variant, the output of the audio and/or the turn-on of the light are examples of "notify the user that it is capable of accepting the input of the user authentication information".

(Variant 5) In the above embodiment, the printer 100 determines whether the second CO is stored in the memory 134 (T104 of FIG. 7). Instead of this, the printer 100 may determine whether the SSID and the password used in establishing the Wi-Fi connection with the AP 7 is stored in the memory 134. In this variant, the SSID and the password are examples of "second connection information".

(Variant 6) The process of T104 of FIG. 7 may not be executed. In this variant, "second connection information" may be omitted.

(Variant 7) In the above embodiment, the printer 100 determines whether the state of the printer 100 is the default state (T106 of FIG. 7). Instead of this, for example, the password may not be stored in the memory 134 at the time of shipping of the printer 100. Further, the printer 100 may not display the notification screen in a case where a password is not stored in the memory 134 and may display the notification screen in a case where a password is stored in the memory 134. In this variant, a state in which a password is not stored and a state in which a password is stored are respectively an example of "first state" and "second state". In another variant, the printer 100 may store one of a setting "ON" restricting usage of the print function by a specific user and a setting "OFF" not restricting the usage of the print function by the specific user. Further, the printer 100 may not display the notification screen in a case where the setting "OFF" is stored and may display the notification screen in a case where the setting "ON" is stored. In this variant, a state in which the setting "OFF" is stored and a state in which the setting "ON" is stored are respectively an example of "first state" and "second state".

(Variant 8) The process of T106 of FIG. 7 may not be executed. In this variant, "first state" and "second state" may be omitted.

(Variant 9) In the above embodiment, the printer 100 initiates the operation in the non-respondent state in the case where the power of the printer 100 is turned on. Then, the printer 100 shifts from the non-respondent state to the respondent state (T122) in the case where the PReq is received from the terminal 10 and the second CO is determined as being stored in the memory 134 (YES to T104). Instead of this, the printer 100 may determine in which one of the non-respondent state and the respondent state it should be operating in the case where the power of the printer 100 is turned on. For example, the printer 100 may initiate operating in the respondent state in the case of determining that the second CO is not stored in the memory 134, and may initiate operating in the non-respondent state in the case of determining that the second CO is stored in the memory 134. Then, in a case where the PReq is received from the terminal 10 and the second CO is not stored in the memory 134, the printer 100 may maintain its operation in the respondent state without displaying the notification screen, and in a case where the PReq is received from the terminal 10 and the second CO is stored in the memory 134, the printer 100 may display the notification screen, and may shift from the non-respondent state to the respondent state according to whether the authentication taking place thereafter is successful. The determination on which one of the non-respondent state respondent state the printer 100 is to operate may be made based on whether the printer 100 is in the default state. In this variant, maintaining the operation in the respondent state is an example of "operate in the respondent state".

(Variant 10) For example, the printer 100 may cause the print executing unit 118 to print the QR code in T124 of FIG. 7 instead of displaying the QR code on the display unit 114. According to this variant, for example, the communication according to the DPP scheme can be executed and the Wi-Fi connection can be established between the printer 100 and the AP 6 even in a situation where the printer 100 is not provided with the display unit 114. In this variant, the print executing unit 118 is an example of "output unit". In another variant, the printer 100 may be provided with a wireless interface different from the Wi-Fi I/F 116 (such as a NFC I/F and a Bluetooth I/F). This Bluetooth I/F includes a wireless interface for executing communication according to the Bluetooth scheme version 4.0 or higher. In this case, the printer 100 may send the public key PPK1, the channel list, and the MAC address "abc" to the terminal 10 in T124 via this wireless interface. In this variant, the wireless interface different from the Wi-Fi I/F 116 is an example of "output unit". Further, in this variant, "specific information" may not be "coded image".

(Variant 11) A standard "Device Provisioning Protocol Technical Specification Version 1.1" created by the Wi-Fi Alliance describes that shared codes, keys, phrases, and words are called "codes". In T124, instead of the QR code, the printer 100 may display, on the display unit 114, an image including a shared code, a key, a phrase, or a word that are obtained by coding the public key PPK1, the channel list, and the MAC address "abc".

(Variant 12) In T35 of FIG. 2, the NA process may be executed between the terminal 10 and the printer 100 and the Wi-Fi connection may be established between the terminal 10 and the printer 100. That is, "second external device" may be a same device as "first external device".

(Variant 13) The process of FIG. 8 may not be executed. That is, the printer 100 may not shift from the respondent state to the non-respondent state in the case where the predetermined time has elapsed since having shifted to the respondent state. In this variant, "shift the state of the communication device from the respondent state to the non-respondent state" may be omitted. Further, in another variant, in T526 of FIG. 8, the printer 100 may monitor acceptance of an instruction from the user to shift to the non-respondent state instead of monitoring the predetermined time elapsing. In this variant, the acceptance of the instruction from the user is an example of "specific condition".

(Variant 14) In the above embodiment, the Wi-Fi connection between the printer 100 and the AP 6 is established using the terminal 10. Instead of this, for example, a Wi-Fi connection between the printer 100 operating as a Group Owner (G/O) according to the WFD scheme (i.e., a device operating as a parent station) and another device (i.e., a device operating as a child station) may be established using the terminal 10. That is, "second external device" may not be "parent station device".

(Variant 15) "Communication device" may not be the printer, and may be another device such as a scanner, a multi-function peripheral, a portable terminal, a PC, and a server.

(Variant 16) The processes of T102 and T122 of FIG. 7 may not be executed. In this variant, the printer 100 may operate in the respondent state at all times. Further, the printer 100 may display the notification screen in a case where a predetermined operation (such as an operation to log in) is performed on the operation unit 112, and may display the QR code when the authentication is successful. In this variant, "accept an input of user authentication information" may be executed with the predetermined operation being performed on the printer 100 as a trigger, and "shift a state of the communication device from a non-respondent state to a respondent state" may be omitted.

(Variant 17) The processes of T102 and T124 of FIG. 7 may not be executed. In this variant, the printer 100 may display the notification screen in a case where a predetermined operation (such as an operation to log in) is performed on the operation unit 112. Further, after the state of the printer 100 has shifted to the respondent state due to the authentication being successful, the terminal 10 may capture the QR code adhered to a body of the printer 100 and obtain the public key PPK1, etc. In this variant, "accept an input of user authentication information" may be executed with the predetermined operation being performed on the printer 100 as a trigger.

(Variant 18) "Accept an input of user authentication information" is not limited to the process of inputting the password to the operation unit 112 of the printer 100 (T110 of FIG. 7). For example, the password may be stored in the IC card, and the password may be inputted to the printer 100 by a card reader of the printer 100 reading the password in this IC card. Further, the password may be stored in the terminal, and the password may be inputted to the printer 100 by the printer 100 receiving the password from the terminal. Here, the password may be received using a wireless connection according to various communication schemes, such as the NFC scheme, the Bluetooth scheme, the WFD scheme.

(Variant 19) In the above embodiment, the respective processes of FIGS. 2 to 8 are implemented by software (e.g., the program 136). Instead of this, one or more of the processes may be implemented by hardware such as a logic circuit.

What is claimed is:

1. A communication device comprising:
a processor;
an output unit;
a wireless interface; and
a memory storing computer-readable instructions,
wherein the computer-readable instructions, when executed by the processor, cause the communication device to:
accept an input of a password for authenticating a user of the communication device in a case where second connection information is stored in the memory, the second connection information being information for establishing a second wireless connection via the wireless interface between the communication device and a third external device;
in a case where the second connection information is stored in the memory and authentication using the inputted password is successful, cause the output unit to output specific information obtained by using a public key, the public key being obtained by a first external device in response to the specific information being outputted, wherein in a case where the authentication using the inputted password fails, the specific information is not outputted,
wherein the specific information is outputted without accepting the input of the password in a case where the second connection information is not stored in the memory;
after the specific information has been outputted, receive an authentication request in which the public key is used from the first external device via the wireless interface;
in a case where the authentication request is received from the first external device, send an authentication response to the first external device via the wireless interface;
after the authentication response has been sent to the first external device, receive first connection information from the first external device via the wireless interface, the first connection information being for establishing a first wireless connection via the wireless interface between the communication device and a second external device, the second external device is a parent station device that is to operate as a parent station of a wireless network, the second external device being different from the first external device; and in a case where the first connection information is received from the first external device, establish the first wireless connection via the wireless interface between the communication device and the second external device by using the first connection information, wherein the communication device participates in the wireless network by establishing the first wireless connection.

2. The communication device as in claim 1, wherein
the input of the password is accepted in a case where a state of the communication device is a second state among a first state and the second state, the first state being a state where usage of the communication device is not restricted, the second state being a state where the usage of the communication device is restricted, the specific information is outputted in a case where the state of the communication device is the second state and the authentication using the password is successful, and the specific information is outputted without accepting the input of the password in a case where the state of the communication device is the first state.

3. The communication device as in claim 1, wherein
the specific information is a coded image obtained by the public key being coded.

4. The communication device as in claim 3, wherein
the coded image is a QR code (Registered Trademark), and the public key is obtained by the first external device by the QR code being captured by the first external device.

5. The communication device as in claim 1, wherein
the output unit is a display unit for displaying an image, and the specific information is displayed on the display unit which is the output unit.

6. The communication device as in claim 1, wherein
the computer-readable instructions, when executed by the processor, further cause the communication device to:
in a case where the authentication using the inputted password is successful, shift a state of the communication device from a non-respondent state to a respondent state, wherein in the case where the authentication using the inputted password fails, the state of the communication device is maintained in the non-respondent state, the non-respondent state being a state where the authentication response is not sent, the respondent state being a state where the authentication response is sent to the first external device in response to the authentication request being received from the first external device, and wherein in a case where the authentication request is received from the first external device after the state of the communication device has been shifted to the respondent state, the authentication response is sent to the first external device via the wireless interface.

7. The communication device as in claim 6, wherein
the specific information is information obtained by using the public key and communication channel information indicating a first communication channel predetermined in the communication device, the communication channel information is obtained by the first external device by the specific information being outputted, the respondent state includes monitoring receipt of the authentication request using the first communication channel from the first external device, and the authentication response is sent to the first external device via the wireless interface in a case where the authentication request using the first communication channel is received from the first external device after the state of the communication device has been shifted to the respondent state.

8. The communication device as in claim 7, wherein
the first wireless connection is established via the wireless interface between the communication device and the second external device by using a second communication channel different from the first communication channel.

9. The communication device as in claim 6, wherein
the computer-readable instructions, when executed by the processor, further cause the communication device to:
in a case where a specific condition is fulfilled after the state of the communication device has been shifted to the respondent state, shift the state of the communication device from the respondent state to the non-respondent state.

10. The communication device as in claim 1, wherein
the computer-readable instructions, when executed by the processor, further cause the communication device to:
receive a specific signal from the first external device; and
in a case where the specific signal is received from the first external device, notify the user that it is capable of accepting the input of the password.

11. The communication device as in claim 10, wherein
a notification screen for notifying the user that it is capable of accepting the input of the password is displayed on a display unit of the communication device.

12. A communication device comprising:
a processor;
an output unit;
a wireless interface; and
a memory storing computer-readable instructions,
wherein the computer-readable instructions, when executed by the processor, cause the communication device to:
accept an input of a password for authenticating a user of the communication device in a case where second connection information is stored in the memory of the communication device, the second connection information being information for establishing a second wireless connection via the wireless interface between the communication device and a third external device;
in a case where the second connection information is stored in the memory and authentication using the inputted password is successful, shift a state of the communication device from a non-respondent state to a respondent state, wherein in a case where the authentication using the inputted password fails, the state of the communication device is maintained in the non-respondent state, the non-respondent state being a state where an authentication response which is a response to an authentication request is not sent, the respondent state being a state where the authentication response is sent to a first external device in response to the authentication request being received from the first external device;

in a case where the second connection information is not stored in the memory, operate in the respondent state without accepting the input of the password;
receive the authentication request from the first external device via the wireless interface;
in a case where the authentication request is received from the first external device after the state of the communication device has been shifted to the respondent state, send the authentication response to the first external device via the wireless interface;
after the authentication response has been sent to the first external device, receive first connection information from the first external device via the wireless interface, the first connection information being for establishing a first wireless connection via the wireless interface between the communication device and a second external device, the second external device is a parent station device that is to operate as a parent station of a wireless network, the second external device being different from the first external device; and
in a case where the first connection information is received from the first external device, establish the first wireless connection via the wireless interface between the communication device and the second external device by using the first connection information,
wherein the communication device participates in the wireless network by establishing the first wireless connection.

13. The communication device as in claim 12, wherein
the input of the password is accepted in a case where the state of the communication device is a second state among a first state and the second state, the first state being a state where usage of the communication device is not restricted, the second state being a state where the usage of the communication device is restricted,
the state of the communication device is shifted from the non-respondent state to the respondent state in a case where the state of the communication device is the second state and the authentication using the password is successful, and
the computer-readable instructions, when executed by the processor, further cause the communication device to:
in a case where the state of the communication device is the first state, operate in the respondent state without accepting the input of the password.

14. The communication device as in claim 12, wherein
the respondent state includes monitoring receipt of the authentication request using a first communication channel predetermined in the communication device from the first external device, and
the authentication response is sent to the first external device via the wireless interface in a case where the authentication request using the first communication channel is received from the first external device after the state of the communication device has been shifted to the non-respondent state.

15. The communication device as in claim 14, wherein
the first wireless connection is established via the wireless interface between the communication device and the second external device by using a second communication channel different from the first communication channel.

16. The communication device as in claim 12, wherein
the computer-readable instructions, when executed by the processor, further cause the communication device to:
in a case where a specific condition is fulfilled after the state of the communication device has been shifted to the respondent state, shift the state of the communication device from the respondent state to the non-respondent state.

17. A non-transitory computer-readable recording medium storing computer-readable instructions for a communication device, wherein the communication device comprising:
a processor;
an output unit; and
a wireless interface,
wherein the computer-readable instructions, when executed by the processor, cause the communication device to:
accept an input of a password for authenticating a user of the communication device;
in a case where authentication using the inputted password is successful, cause the output unit to output specific information obtained by using a public key, the public key being obtained by a first external device in response to the specific information being outputted, wherein in a case where the authentication using the inputted password is failed, the specific information is not outputted, wherein the specific information is a coded image obtained by the public key being coded;
after the specific information has been outputted, receive an authentication request in which the public key is used from the first external device via the wireless interface;
in a case where the authentication request is received from the first external device, send an authentication response to the first external device via the wireless interface;
after the authentication response has been sent to the first external device, receive first connection information from the first external device via the wireless interface, the first connection information being for establishing a first wireless connection via the wireless interface between the communication device and a second external device, the second external device is a parent station device that is to operate as a parent station of a wireless network, the second external device being different from the first external device; and
in a case where the first connection information is received from the first external device, establish the first wireless connection via the wireless interface between the communication device and the second external device by using the first connection information,
wherein the communication device participates in the wireless network by establishing the first wireless connection.

* * * * *

UNITED STATES PATENT AND TRADEMARK OFFICE
CERTIFICATE OF CORRECTION

PATENT NO. : 11,706,620 B2
APPLICATION NO. : 17/032532
DATED : July 18, 2023
INVENTOR(S) : Satoshi Suzuki Page 1 of 1

It is certified that error appears in the above-identified patent and that said Letters Patent is hereby corrected as shown below:

In the Claims

Column 19, Claim 1, Line 1 should read:
nal device, the second external device being a parent station Column 21, Claim 12, Line 17 should read:
nal device, the second external device being a parent station Column 22, Claim 17, Line 47 should read:
nal device, the second external device being a parent station Signed and Sealed this
Fourteenth Day of November, 2023

Katherine Kelly Vidal
*Director of the United States Patent and Trademark Office*